3,409,572
THERMOPLASTIC POLYMERS PREPARED FROM COAL TAR

Dennis Neal, Convent Station, and John A. Lopez, Springfield, N.J., assignors to Shell Oil Company, New York, N.Y., a corporation of Delaware
No Drawing. Filed Oct. 11, 1965, Ser. No. 494,935
7 Claims. (Cl. 260—18)

ABSTRACT OF THE DISCLOSURE

New thermoplastic reaction products are disclosed. These products are obtained by reacting at 300–350° F. a coal tar, a polyepoxide, a fatty acid pitch, and from 1 to 75% by weight of the chemical equivalent amount, based on the polyepoxide, of a compound possessing a plurality of active hydrogen atoms. A process for the use of these products in the form of impregnated tapes to be applied cold to metal surfaces, is also disclosed.

---

This invention relates to new polymers and their preparation. More particularly, the invention relates to new thermoplastic quaterpolymers and to their uses.

There has been a need in industry for sometime for a corrosion resistant and solvent and chemical resistant coating that can be cold applied to surfaces for their protection. Such a material is especially desirable for coating metal surfaces, such as steel pipes and the like, that are placed underground.

Coal tar and coal tar-based impregnants have very desirable properties of resistance to chemicals, solvents, moisture and corrosion. However, coal tar based coatings must be hot-applied since their rheological properties are such that cold application is unsuitable. For example, if a coal tar-based impregnated tape has sufficient flexibility for wrapping around a pipe or bending at corners, it also flows out of the tape at storage temperatures. If the material has no cold flow, it is too brittle to be wrapped around a pipe at lower temperatures.

Asphalt preimpregnated tapes on the other hand while possessing desirable rheological properties and thereby may be cold wrapped successfully, do not have the chemical resistant properties possessed by coal tar materials and required for most underground pipe coating applications and the like.

Thus, it has in the past been the necessary practice to hot-apply a coal digested coal tar to the pipes to be coated in the field. Such a treatment is slow and time consuming, difficult to operate, relatively costly since additional help and equipment is needed and is not completely effective. In addition, the hot applied tape systems have the disadvantage that insufficient heating results in poor bonding and gaps in the tape whereas too much heat causes the material to become thin, burn, or flow off the pipe.

It is thus an object of this invention to provide materials which have the chemical resistant properties of coal tar products and at the same time the desirable rheological properties of blown asphalt. It is also an object of the invention to provide a new class of thermoplastic polymers. It is a further object to provide a new class of thermoplastic quaterpolymers which can be prepared from coal products. It is also an object to provide new thermoplastic terpolymers which are useful particularly for coating of metal surfaces to impart water and chemical resistance. It is a further object to provide new thermoplastic quaterpolymers which can be used to prepare valuable impregnated tapes. It is also an object to provide new impregnated tapes which are useful in the coating of metal pipes and which may be cold applied. These and other objects will be apparent from the following description.

The new thermoplastic quaterpolymers of this invention comprise the polymeric reaction product of a polyepoxide, and preferably a glycidyl polyether of a polyhydric phenol, a coal product such as coal tar, from 1 to 75% by weight of the theoretical amount, based on the polyepoxide, of a compound reactive with epoxide groups and preferably one possessing a plurality of amino hydrogen atoms, and especially an amino-containing polyamide of an aliphatic polyamine and a polymerized unsaturated fatty acid, and a pitch of a fatty acid and preferably a vegetable oil fatty acid pitch.

The coal products used in preparing the new polymers comprise the coal tars and coal tar pitches, and preferably those having softening points below 190° F. and a solubility in carbon disulfide of at least 50%. The expression "tar" as used herein refers to products obtained in connection with the destructive distillation of coal. When part of the volatile material is removed, the residue is called coal tar pitch. In vol. 1, page 401 of Abraham, "Asphalts and Allied Substances," 5th ed., residuals having a fusing point above 80° F. are considered coal tar pitches, while those having fusing points 80° F. or below are refined coal tars. As used herein, "softening point" or "fusing point" refer to values obtained by the cube method as described in vol. II, Abraham, "Asphalts and Allied Substances," 5th ed.

Particularly preferred coal products to be used in making the new polymers comprise the coal tars and coal tar pitches having specific gravity between 0.80 and 1.50, a fusing point below 50° F., an Engler viscosity at 40° C. between 8 and 40, and a Float test at 32° C. of between 100 and 200.

The polyepoxides to be used in preparing the compositions of the present invention include those compounds possessing more than 1 vic-epoxy group, i.e., a

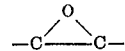

group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl-9,12,15-octadecatriethnoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example:

di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,3-dicarboxylate,
di(4,5-epoxyoctadecyl)malonate.

Another group of the epoxy-containing materials include those epoxidized esters of unsaturated alcohols and unsaturated carboxylic acids, such as 2,3-epoxybutyl, 3,4-epoxypentanoate; 3,4-epoxyhexyl, 3,4-epoxypentanoate; 3,4-epoxycyclohexy 3,4-epoxycyclohexanoate; 3,4-epoxycyclohexyl 4,5 - epoxyoctanoate; 2,3 - epoxycyclohexyl methyl epoxycyclohexane carboxylate.

Still another group of the epoxy-containing materials include epoxidized derivatives of polyethylenically unsaturated polycarboxylic acids such as, for example:

dimethyl 8,9,12,13-diepoxyeicosanedioate;
dibutyl 7,8,11,12-diepoxyoctadecanedioate;
dioctyl 10,11-diethyl-8,9,12,13-diepoxy-eicosanedioate;
dihexyl 6,7,10,11-diepoxyhexadecanedioate;
didecyl 9-epoxy-ethyl-10,11-epoxyoctadecanedioate;
dibutyl-3-butyl-3,4,5,6-diepoxycyclohexane-1,2-dicarboxylate;
dicyclohexyl 3,4,5,6-diepoxycyclohexane-1,2,-dicarboxylate;
dibenzyl 1,2,4,5-diepoxycyclohexane-1,2,dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value of 0.514 eq./100 g.) and the like and mixtures thereof.

Other examples of the glycidyl ethers include the glycidyl ethers of novolac resins which resins are obtained by condensing an aldehyde with phenol. A typical member of this class is the epoxy resin from a condensate of formaldehyde and 2,2-bis(4-hydroxyphenyl)propane novolac resin.

Of particular value in the process of the invention are the polyepoxides containing elements selected from the group consisting of carbon, hydrogen, oxygen and halogen atoms.

The other materials to be used in the process of the invention comprise compounds reactive with epoxy groups, e.g., has a plurality of active hydrogen or anhydride group, and preferably those which possess a plurality of amino hydrogen atoms, i.e., a plurality of

groups wherein N is an amino nitrogen. These include the aliphatic, cycloaliphatic, aromatic or cyclic amino as well as derivatives thereof as well as the derivative still containing the necessary amino hydrogen.

Examples of these materials include, among others, the aliphatic polyamines, such as, for example:

ethylene diamine,
diethylene triamine,
triethylene tetramine,
tetraethylene pentamine,
1,4-aminobutane,
1,3-diaminobutane,
hexamethylene diamine,
3-(n-isopropylamino)propylamine,
N,N'-diethyl-1,3-propanediamine,
hexapropylene heptamine,
penta(1-methyl-propylene)-hexamine,
tetrabutylenepentamine,
hexa-(1,1-dimethylethylene)heptamine,
di(1-methylbutylene)triamine,
pentaamylhexamine,
tri(1,2,2-trimethylethylene)tetramine,
tetra(1,3-dimethylpropylene)pentamine,
penta(1,5-dimethylamylene)hexamine,
penta-(1,2-dimethyl-1-isopropylethylene)hexamine and
N,N'-dibutyl-1,6-hexanediamine.

Aliphatic polyamines coming under special consideration are the alkylene polyamines of the formula

wherein R is an alkylene radical, or a hydrocarbon substituted alkylene radical, and $n$ is an integer of at least one, there being no upper limit to the number of alkylene groups in the molecule.

Especially preferred aliphatic polyamines comprise the polyethylene polyamines of the formula

wherein $n$ is an integer varying from about 2 to 8.

Other examples include the polyamines possessing cycloaliphatic ring or rings, such as, for example:

1-cyclohexylamino-3-aminopropane,
1,4-diaminocyclohexane,
1,3-diaminocyclopentane,
di(aminocyclohexyl)methane,
di(aminocyclohexyl)sulfone,
1,3-di(aminocyclohexyl)propane,
4-isopropyl-1,2-diaminocyclohexane,
2,4-diaminocyclohexane,
N,N'-diethyl-1,4-diaminocyclohexane, and the like. Preferred members of this group comprise those polyamines having at least one amino or alkyl-substituted amino group attached directly to a cycloaliphatic ring containing from 5 to 7 carbon atoms. These cycloaliphatic amines are preferably obtained by hydrogenating the corresponding aromatic amine. Thus di(aminocyclohexyl)methane is obtained by hydrogenating methylene dianiline.

Still another group comprise the aminoalkyl-substituted aromatic compounds, such as, for example, di(aminoethyl)benzene, di(aminoethyl)benzene, tri(aminoethyl)benzene, tri(aminobutyl)naphthalene and the like.

Still another group comprise the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N-aminoisopropyl-3-butoxypiperazine, N - aminoethylpiperazine, 2,5-dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Coming under special consideration, particularly because of the better control over the rate of cure obtained, are the acetone soluble derivatives of the above polyamines as may be obtained by reacting the above-described polyamines with other materials to remove some but not all of the active amino hydrogen.

A group of such materials include those acetone soluble products obtained by reacting the polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mol of monoepoxide. The excess amine can be retained or removed by distillation. Examples of the monoepoxide-polyamine reaction products include, among others, N-(hydroxypropyl) diethylene triamine (reaction product of propylene oxide and diethylene triamine) and N-(2-hydroxy-2-phenoxypropyl) diethylene triamine (reaction product of phenyl glycidyl ether and diethylene triamine).

A group of related materials are those soluble fusible products obtained by reacting a polyepoxide with a monoamine. Examples of polyepoxides that may be used include any of those noted above for use in the compositions of the present invention. Examples of the monoamines include, among others, secondary amines as dimethylamine, diethylamine, dipropylamine, dibutylamine, di(tert-butyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper portions. The desired soluble fusible products are obtained when the polyepoxide and monoamine are combined so as to have at least 1.5 mols of the amine per epoxide equivalent of the polyepoxide.

Particularly preferred amino-hydrogen containing material to be used comprises the amino hydrogen containing polyamides as may be obtained by using the polyamines containing more than 2 amino groups or by using an excess of the polyamines.

The preferred polyamides used in the process of the invention comprise the reaction product of an aliphatic or cycloaliphatic polycarboxylic acid containing at least 7 carbon atoms and preferably those containing at least seven carbon atoms between the acidic groups, and an aliphatic polyamine, the resulting product possessing a group reactive with epoxy groups, such as, for example, free amino groups or free carboxyl groups.

Examples of polybasic acid materials used in making these polyamides include, among others, 1,10-decanedioic acid, 1,12-dodecadienedioic acid, 1,20-eicosadienedioic acid, 1,14-tetradecanedioic acid, 1,18-octadecanedioic acid and dimerized and trimerized unsaturated fatty acids obtained by heating polymerizing drying oil fatty acids under known conditions. Normally, this is effected by utilizing the lower aliphatic esters of drying oil esters so as to prevent decarboxylation during the heating period. During the heating period, dimers and trimers are usually obtained. The process is illustrated in the "Industrial and Engineering Chemistry," vol. 38, page 1139 (1946). The structures of the products so obtained are believed to be those given in "Industrial Engineering Chemistry," vol. 33, page 89 (1941). Numerous drying oil acids can be used in preparing the polymerized acids, but the preferred acids are those containing from 16 to 34 carbon atoms, such as, for example, linoleic acid, linolenic acid, eleostearic acid, and licannic acid, such as may be derived from oils, such as soybean oil, linseed oil, tung oil, periolla, oiticica, cottonseed, corn, tall, sunflower, dehydrated castor oil and the like. The expression "polymerized unsaturated fatty acids" as used herein in a generic sense is intended to include the polymerized mixture of dimerized acids, trimerized acids, higher polymerized acids as well as small portions of residual monomer.

The aliphatic polyamine such as, for example, ethylene may be any di-, tri- or polyamine such as, for example, ethylene diamine, diethylene triamine, triethylene tetramine, tetraethylene pentamine, 1,4-diaminobutane, 1,3-diaminobutane, hexamethylene diamine, 3-(N-isopropylamino)propylamine, and the like. Particularly preferred polyamines are those containing from 2 to 12 carbon atoms, and especially those of the formula

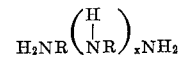

wherein $x$ is an integer of 0 to 10 and R is a bivalent hydrocarbon radical containing from 1 to 10 carbon atoms. Coming under special consideration are those polyamines having at least 3 atoms intervening between the amine groups principally involved in the amidification reaction. These three atoms may be carbon atoms or hetero atoms, such as nitrogen atoms.

Especially preferred polyamides are those derived from the aliphatic polyamides containing no more than 12 carbon atoms and polymeric fatty acids obtained by dimerizing and trimerizing ethylenically unsaturated fatty acids containing up to 24 carbon atoms. These preferred polyamides have a viscosity between 10 and 1750 poises at 40° C., and preferably 20 to 250 poises at 40° C. Preferred polyamides also have amine value between 50 and 450. Amine number is number of milligrams of KOH equivalent to the free amino groups present in one gram of the polyamide.

Coming under special consideration are the fluid polyamides produced by the condensation of polymerized linoleic acid with an aliphatic polyamine, e.g., diethylene triamine, and having the following properties: amino value 210–230, a viscosity of 500–750 poises at 40° C., specific gravity of 0.99 and weighing about 8.3 pounds per gallon.

The polyamides used in the process of the invention preferably possess at least one and more preferably two or more hydrogen attached to amino nitrogen atoms. Such products are preferably obtained by controlling the proportion of reactants so that there is an excess of the polyamine reactant. A process for making such polyamides is illustrated in U.S. 2,450,940 and U.S. 2,695,908 and so much of these patents relative to the preparation of the polyamides is incorporated herein by reference.

Other compounds reactive with epoxy groups that may be used include the polybasic acids and anhydrides, such as phthalic acid, phthalic acid anhydride, hexahydrophthalic anhydride, succinic acid, adipic acid, dimerized linoleic acid, trimerized linoleic acid, pyromellitic anhydride, trimellitic acid and anhydride, pyromellitic acid, tetrahydrophthalic anhydride, tetrahydropyromellitic anhydride, methyl nadic anhydride, chlorendic anhydride, acid terminated polyesters and the like.

Still other compounds include the polymercaptans, and preferably those possessing a mercaptan group in the vicinity of other groups, such as ester groups, OH groups and the like, such as adducts of hydrogen sulfide and polyepoxides, thioglycollates and the like.

The fatty acid pitches used in preparing the compositions of the invention are pitches derived from refining and treatment of fats and oils and especially vegetable oils such as castor oil, soybean oil, linseed oil, peanut oil, corn oil, olive oil, safflower oil, tung oil and cottonseed oil, etc. and mixtures thereof, cottonseed oil being preferred. The pitches may be modified by the incorporation therein of an alkali or alkaline earth metal oxide such as sodium oxide, potassium oxide, barium oxide, calcium oxide, etc. Calcium oxide is preferred. The pitch compositions are well known and are commercially available. Such commercial compositions often contain small amounts of other pitches and/or resin materials.

The amount of the coal product to be used may be varied within certain limits from about 50 to 99% by weight of the total mixture and preferably from about 80 to 95%.

The amount of the compound reactive with epoxy groups may be varied only within certain limits. The thermoplastic quaterpolymers are obtained when the amount of this material varies from 1% to 75% by weight of the theoretical amount of the compound as compared to the polyepoxide, i.e., the amount theoretically needed to furnish one active hydrogen as acid H, mercaptan hydrogen or amino hydrogen per epoxy group or an anhydride group per epoxy group. Preferably the amount will vary from about 1 to 50% of the theoretical amount of polyepoxide.

The amount of fatty acid pitch used in the composition is between about 1 and 50% by weight and preferably between about 5 and 30% by weight based on the total composition.

The polymer is formed by merely mixing the four components together and heating. It is preferred to combine the coal tar and the epoxy-reactive material and heat to about 200° F. at which time the polyepoxide is added. Heating is then continued up to about 300° F. when it is preferable to add the fatty acid pitch. Heating is then maintained or continued up to 350° F. and fillers or modifiers if used are added. Polymerization takes place between about 250 and 350° F.

The polymers of this invention offer the advantage of having relatively low temperature susceptibility and thus possess rheological properties extremely unusual for coal tar based materials in that they are very similar to highly blown asphalts. Generally, it is known that coal tars and coal tar based materials have viscosities or consistencies that change rapidly with temperature changes. Thus, such materials have high temperature susceptibility. Often, with such materials, the temperature susceptibility itself varies at different temperatures and thus the temperature susceptibility is not constant. However, for some uses such as impregnated tapes which are not normally stored or applied under extreme temperature conditions, i.e., between about 0° to 46° C., temperature susceptibility is considered to be constant.

On the other hand, blown asphalt is a material which tends to be rubbery, that is, it resists flow and has good flexibility because its viscosity or consistency does not change greatly with temperature.

A measure of temperature susceptibility is the slope of the linear curve obtained by plotting the log of the penetration of a material against the temperature and is characterized herein as alpha. The penetration is a measure of consistency and also hardness. Thus, at moderate penetrations, the lower the value of alpha, the more suitable the cold flow and flexibility properties of the material. The penetration of a bituminous material may be measured by observing the distance a standard needle penetrates vertically into a sample of the material at certain conditions of temperature, load and time.

The compositions prepared for various uses utilizing the polymers of the invention may contain other ingredients which do not increase the temperature susceptibility or affect hardness of the polymer and which do not adversely affect the desired chemical resistance properties of the product. Such additional ingredients include plasticizers such as dioctylphthalate, tricresyl phosphate, etc., silicones, and fillers such as asbestos, celite, talc, mineral fillers and the like. The selection of these additional ingredients is dependent on the particular uses intended and economic considerations, etc. However, the specific modifiers and/or fillers selected should not adversely affect the properties of the unmodified polymer.

The polymers of the invention possess properties which make them valuable for a number of applications. Since the polymers have very desirable rheological and chemical resistant properties, they are particularly suited for use in the preparation of preimpregnated tape for use in the protection of metal surfaces such as underground steel pipe. The preferred method for the preparation of such tape comprises dip-impregnating the desired tape, such as is generally prepared from glass cloth, with the molten impregnant. This is preferably accomplished by feeding the glass cloth continuously through the tank of molten impregnant, passing the impregnated cloth through rollers to squeeze out the excess impregnant and then backing the sheet with a very thin sheet of polyethylene. The prepreg-tape is then passed through a series of cooling rollers and is wound onto large rolls after cooling.

To use the prepreg-tape, one preferably applies a wet primer, such as asphalt solution or liquid tar spray to the pipe and then winds the tape firmly around the pipe so that it is bonded firmly to the pipe by the primer. No post curing of the tape is required. After the primer has dried, the tape is firmly bonded to the pipe and the pipe has excellent corrosion resistance and resistance to marring. The coating also demonstrates excellent resistance to hydrogen blistering and to galvanic action as well as cold flow.

The polymers may also be used for the preparation of moldings or castings or for protective coating applications such as for roofing, waterproofing metal or concrete structures, etc.

The following examples are given to illustrate the manner in which the invention is carried out and also the advantages of the polymers of the invention. The examples are for the purpose of illustration only and the invention is not to be regarded as limited to any of the specific compounds or conditions reacted therein. The penetration values are obtained by observing the distance in tenths of a millimeter that a standard needle under a certain load penetrates vertically into a sample of material at certain temperatures and times as set forth in ASTM D5-595 and Shell Method Series 68/59. The temperatures are as set forth and the load and times are 100 grams and 5 seconds respectively at all temperatures.

EXAMPLE I

In the following examples the materials and polymers indicated in the table were tested for penetration under the conditions set forth above. In preparing the coal tar based polymers the coal tar was mixed with the curing agent and the mixture heated to 200° F. at which time the polyepoxide was added. Heating was continued and the fatty acid pitch was added at about 300° F. along with dioctyl phthalate or other modifiers when used. Heating was continued to 350° F. at which fillers such as asbestos when used are added. The polymer was then cooled. The polyepoxide used in the example is EPON 828 (Shell Chemical Company), an epoxy resin having the formula

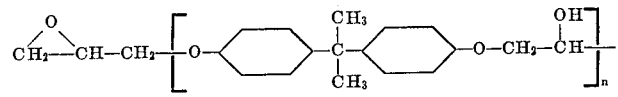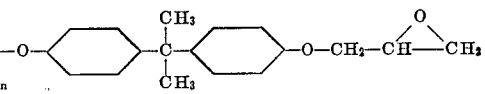

and an epoxide value of 0.52–0.55 equiv./100 parts of resin and an average molecular weight of 380.

The coal tar used in the example is Coal Tar RT-9 having the following properties:

| | |
|---|---|
| Specific gravity 25/25° C. | 1.226 |
| Water content, percent | 0.5 |
| Distillation: | |
| Percent recovery at 270° C. | 4.51 |
| Percent recovery at 300° C. | 13.24 |
| Residue above 300° C. | 45.8 |
| Float test at 32° C. | 137 |

V-15 (Shell Chemical Co.) is a polyamide resin derived from dimerized fatty acid and an aliphatic amine having the properties:

| | |
|---|---|
| Amine value (mg. KOH equiv. to basic nitrogen content of 1 gram) | 210–220 |
| Viscosity, poises, 75° C. | 31–38 |
| Specific gravity 25° C./25° C. | 0.99 |

Zeco 38 (G. S. Ziegler and Co.) is a limed cottonseed pitch containing 3% (±½%) calcium oxide and possessing a penetration at 25° C. of 15–20 mm.

621 asphalt is a highly blown asphalt characterized by the penetration data set forth below:

| Composition (Parts by weight) | 621 Asphalt | A | B | C | D | E | F | G |
|---|---|---|---|---|---|---|---|---|
| Coal tar RT-9 | | 88 | 88 | 88 | 88 | 88 | 88 | 88 |
| EPON 828 | | 9.6 | 9.6 | 9.6 | 9.6 | 9.6 | 9.6 | 9.6 |
| Curing Agent V-15 | | 2.4 | 2.4 | 2.4 | 2.4 | 2.4 | 2.4 | 2.4 |
| Cottonseed Pitch (Zeco 38) | | | 20 | 60 | 20 | 20 | 20 | 20 |
| Dioctylphthalate | | | | | | 1 | 5 | 1 | 5 |
| Superfine Asbestos | | | | | | | | 10 | 25 |
| Penetration: | | | | | | | | | |
| 0° C. | 7 | 2 | 6 | 0 | 2 | 10 | 0 | 7 |
| 25° C. | 23 | 89 | 40 | 17 | 41 | 54 | 29 | 39 |
| 46° C. | 66 | >500 | 146 | 58 | 130 | 167 | 110 | 113 |
| Temperature susceptibility (alpha) | 0.022 | >0.036 | 0.027 | 0.025 | 0.024 | 0.023 | 0.028 | 0.022 |

As noted above, the lower the value of alpha, the more suitable are the desired rheological properties of the polymer. For some applications the temperature susceptibility of the compositions may not be quite so critical and thus alpha values as high as 0.035 or higher may be acceptable. Such applications would include those, for example, wherein the polymer composition is applied directly to a surface to be coated such as in waterproofing or roofing applications and the like. However, where the polymer is to be used in preparing preimpregnated tapes as set forth herein, the temperature susceptibility becomes critical and thus alpha values must be no higher than about 0.030 to be suitable.

EXAMPLE II

The polymer designated F in Example I was melted and a glass cloth was fed through the molten material. The impregnated cloth was then passed through rollers to eliminate excess polymer. The sheet was backed with a very thin sheet of polyethylene.

The polymer impregnated tape was then applied to a wet primed, dry primed and unprimed length of 2-inch pipe respectively, the tape was wound around the outside of the pipe and pressed firmly. The taped pipe was then tested by exposure to various media. One-eight-inch diameter holidays are cut through the coatings in some samples which pipe samples are then placed in either aerated 3% salt brine or crude oil at room temperature as well as oil soaked sand. At the end of three months the samples were inspected for the effect of the brine and oil on the tape. The tapes possessed excellent resistance to the effects of the testing conditions.

We claim as our invention:

1. A thermoplastic reaction product of a coal tar, a polyepoxide, a fatty acid pitch, and from 1 to 75% by weight of the chemical equivalent amount, based on the polyepoxide, of a compound possessing a plurality of amino hydrogen atoms, the amount of said coal tar ranging from about 50 to about 99% by weight of the total mixture, and the amount of said fatty acid pitch ranging from about 1 to about 50% by weight of the total mixture.

2. A thermoplastic reaction product of a coal tar, a glycidyl polyether of a polyhydric phenol, from 1 to 75% by weight of the chemical equivalent amount, based on the glycidyl polyether of a compound possessing a plurality of amino hydrogen atoms, and a fatty acid pitch, the amount of said coal tar ranging from about 50 to about 99% by weight of the total mixture, and the amount of said fatty acid pitch ranging from about 1 to about 50% by weight of the total mixture.

3. A reaction product according to claim 2 wherein the amino hydrogen-containing compound is a polyamide of an aliphatic polyamine and a polymerized unsaturated fatty acid.

4. A reaction product according to claim 2 wherein the glycidyl polyether is a glycidyl polyether of 2,2-bis(4-hydroxyphenyl)propane having a molecular weight between 250 and 3000.

5. A reaction product according to claim 2 wherein the fatty acid pitch contains from about 0.5 to about 5% of an alkali or alkaline earth metal oxide.

6. A process for preparing a thermoplastic reaction product comprising reacting a coal tar, a polyepoxide, a fatty acid pitch and from 1 to 75% by weight of the chemical equivalent amount, based on the polyepoxide of a compound possessing a plurality of amino hydrogen atoms the reaction temperature being between 300 and 350° F.

7. A process for preparing a thermoplastic reaction product comprising reacting a coal tar, a fatty acid pitch, a glycidyl polyether of a polyhydric phenol and from 1 to 50% by weight of the chemical equivalent amount, based on the glycidyl polyether of a polyamide of an aliphatic polyamine and a polymerized unsaturated fatty acid at a reaction temperature between about 300 and 350° F.

References Cited

UNITED STATES PATENTS

| 3,202,621 | 8/1965 | Street. | |
|---|---|---|---|
| 3,190,845 | 6/1965 | Goodnight | 260—28 |
| 3,033,724 | 5/1962 | Stokes. | |
| 3,012,487 | 12/1961 | Mika | 260—28 X |
| 2,956,034 | 10/1960 | Simpson. | |
| 2,824,078 | 2/1958 | Mellick | 260—28 |
| 2,765,288 | 10/1956 | Wittier et al. | 260—28 |

FOREIGN PATENTS

| 1,009,438 | 11/1965 | Great Britain. |
|---|---|---|
| 230,141 | 8/1960 | Australia. |

DONALD E. CZAJA, *Primary Examiner.*

C. W. IVY, *Assistant Examiner.*